United States Patent
Bethge

(10) Patent No.: US 11,758,851 B2
(45) Date of Patent: Sep. 19, 2023

(54) CRACKER ROLLER DISC

(71) Applicant: AGCO International GmbH, Neuhausen (CH)

(72) Inventor: Joerg Bethge, Marktoberdorf (DE)

(73) Assignee: AGCO International GmbH, Neuhausen (CH)

(*) Notice: Subject to any disclaimer, the term of this patent is extended or adjusted under 35 U.S.C. 154(b) by 230 days.

(21) Appl. No.: 17/110,737

(22) Filed: Dec. 3, 2020

(65) Prior Publication Data

US 2021/0161073 A1 Jun. 3, 2021

(30) Foreign Application Priority Data

Dec. 3, 2019 (GB) .................................... 1917622

(51) Int. Cl.
| | |
|---|---|
| *A01D 82/02* | (2006.01) |
| *A01F 11/06* | (2006.01) |
| *A01D 45/02* | (2006.01) |
| *A01D 43/10* | (2006.01) |

(52) U.S. Cl.
CPC .............. *A01F 11/06* (2013.01); *A01D 43/10* (2013.01); *A01D 45/02* (2013.01); *A01D 82/02* (2013.01)

(58) Field of Classification Search
CPC ............ A01D 43/10–107; A01D 43/08; A01D 82/00; A01D 82/02; A01F 11/06; B23C 5/08

See application file for complete search history.

(56) References Cited

U.S. PATENT DOCUMENTS

| 329,729 | A | * | 11/1885 | Gathmann | ............... B02C 7/04 241/261 |
|---|---|---|---|---|---|
| 2,713,277 | A | | 7/1955 | Kaul | |
| 8,480,019 | B1 | * | 7/2013 | Scherer | ................ A01D 41/12 241/293 |
| 2014/0166797 | A1 | | 6/2014 | Den Boer et al. | |
| 2017/0000031 | A1 | * | 1/2017 | Horning, Jr. | ........... A01D 43/10 |

(Continued)

FOREIGN PATENT DOCUMENTS

| DE | 102004026068 B3 | * | 2/2006 | ............... B02C 4/06 |
|---|---|---|---|---|
| DE | 102011052795 A1 | * | 2/2012 | ............. A01D 43/10 |
| DE | 102010046183 A1 | * | 3/2012 | ............. A01D 43/10 |

(Continued)

OTHER PUBLICATIONS

UK Intellectual Property Office, Search Report for priority Application No. GB1917622.I, dated May 27, 2020.

(Continued)

*Primary Examiner* — Alicia Torres
*Assistant Examiner* — Madeline I Runco

(57) ABSTRACT

A cracker roller disc has a first portion radially outward of the centre of substantially constant thickness, and a second portion radially outward of the first portion which second portion tapers towards the periphery of the disc. A plurality of upstanding ridges extending radially outward across the second portion on opposed faces of the disc are machined to define respective conical surfaces forming radially extending edges on opposed faces of the disc. The disc is provided with one or more circular or spiral grooves which cut across the edges in a substantially perpendicular direction to the edges. The grooves extend the effective length of each edge.

4 Claims, 9 Drawing Sheets

(56) References Cited

U.S. PATENT DOCUMENTS

2022/0034035 A1* 2/2022 Gingras .................... B02C 7/12

FOREIGN PATENT DOCUMENTS

| DE | 102012000974 A1 | | 7/2013 | | |
|---|---|---|---|---|---|
| DE | 102013104587 A1 | | 11/2014 | | |
| DE | 20 2015 007502 U1 | | 1/2016 | | |
| EP | 0525422 A2 | * | 2/1993 | | |
| EP | 2666348 A2 | | 11/2013 | | |
| WO | WO-2007051834 A1 | * | 5/2007 | ............. | A01D 43/10 |
| WO | 2012/010396 A1 | | 1/2012 | | |
| WO | 2017/072089 A1 | | 5/2017 | | |

OTHER PUBLICATIONS

Krone, OptiMaize Brochure, published@ https://landmaschinen.krone.de/english/products/forage-harvester/optimaize, printed Dec. 3, 2020 (link referenced in Spec did not work).

European Patent Office, Extended Search Report for related European Patent Application No. EP 20 21 0888, dated Mar. 31, 2021.

* cited by examiner

SECTION A-A

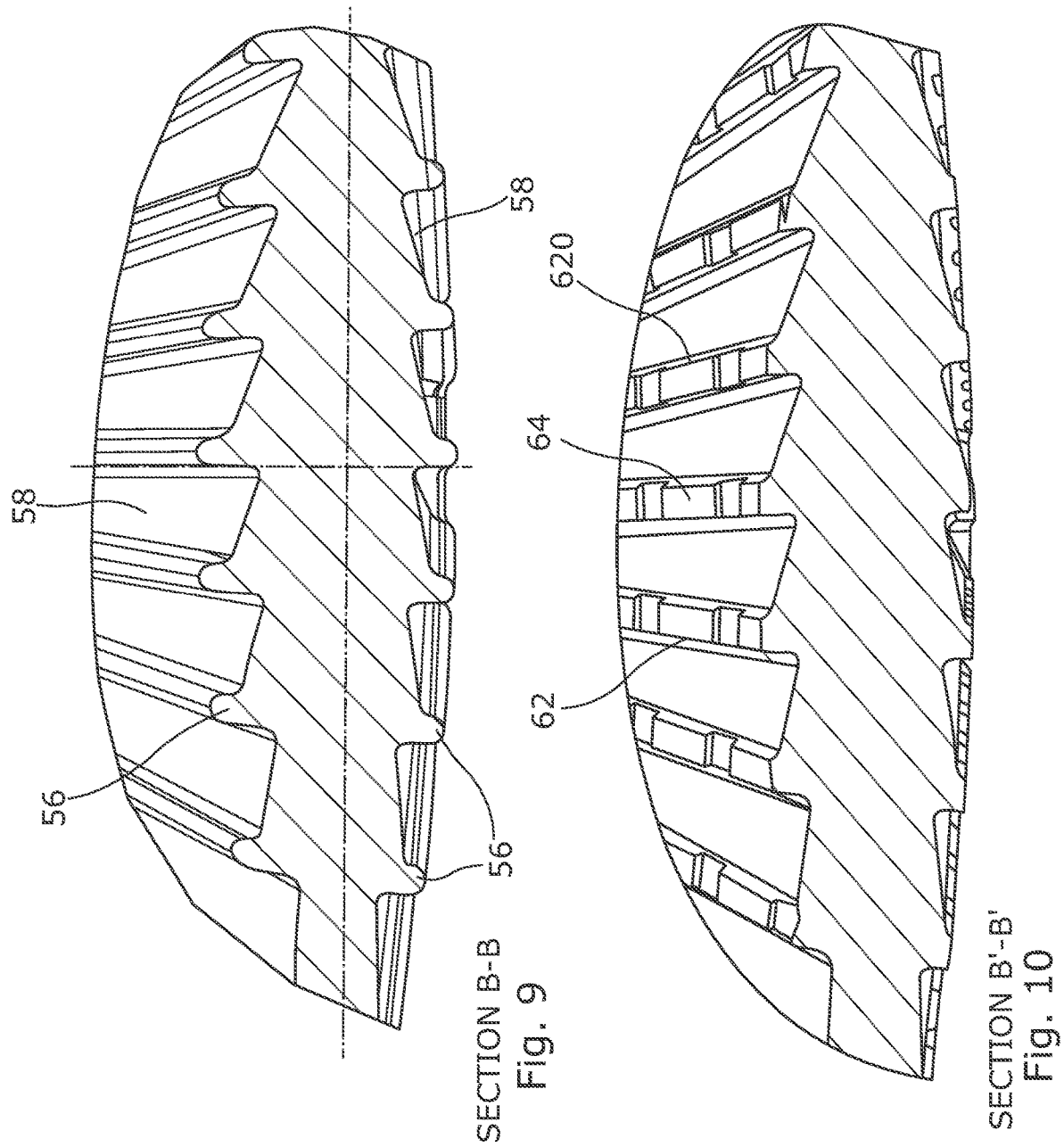

SECTION C-C

US 11,758,851 B2

1
CRACKER ROLLER DISC

BACKGROUND

Field

This invention relates to a cracker roller assembly on a forage harvester or similar agricultural harvesting machine and, more specifically, to discs for use in such an assembly, to a method for the manufacture of such discs, and to discs produced by the method.

Description of Related Art

Forage harvesters are used to harvest different kinds of crops which may require different harvesting processes. If, for example, grass is harvested the forage harvester cuts the grass from the field, compresses the grass in the compression rollers before chopping the harvested material into smaller parts in a chopper drum. The chopped grass is then discharged by a blower via a spout into an accompanying trailer. If, for example, a kernel crop such as maize, is harvested the harvesting process requires an additional step to crack the closed skin of the kernels, therefore, a cracker unit is provided between the chopper drum and the blower to crush each kernel.

Cracker units typically comprise two longitudinal cracker rollers which are arranged with a roller gap (longitudinal space) between them through which harvested crop is fed. As shown in International Patent Application WO 2012/010396 (commonly assigned with the present application) the cracker rollers may be formed by an arrangement of multiple cracker roller discs mounted on a common shaft. Another example is the disc cracker offered by Maschinenfabrik Bernard Krone GmbH (illustrated at http://land-maschinen.krone.de/index.php?id=2548&L=1). Such a multi-disc arrangement has a number of advantages compared to a unitary roller in terms of manufacturing and maintenance costs. For example, foreign object damage occasioned by a solid object passing through the roller gap may be remedied by the replacement of just a few of the discs rather than a complete, and much more expensive, roller.

Each disc typically has an arrangement of radial cutting surfaces across each face to assist in breaking up the material. With a large number (between 20 and 40) of discs in a typical cracker roller assembly, an efficient method of manufacture is clearly desirable. One current technique involves casting the individual discs followed by individual dressing of the cutting surfaces. An alternative technique comprises lathe turning of a blank of material to generate a disc shape and then milling the surface of the blank to cut in the individual cutting edges. Manufacture of cracker roller discs is discussed further in commonly-assigned European patent EP-B-2666348.

An object of the present invention is to provide an improved cracker roller disc.

SUMMARY

According to a first aspect of the present invention there is provided a cracker roller disc, having an axial bore through the centre, a first portion radially outward of the centre of substantially constant thickness, a second portion radially outward of the first portion which second portion tapers towards the periphery, and further comprising a plurality of conical machined surfaces forming radially extending edges on opposed faces of the disc;

characterised in that the edges are interrupted by grooves extending substantially perpendicular to said edges.

The grooves, which may be in the form of a spiral, a circle, or a series of concentric circles, extend the effective length of each edge and improve performance of the disc.

In further aspects, the present invention provides a method of manufacturing the cracker roller disc, and cracker roller comprising a plurality of the discs axially aligned and mounted on a common shaft.

Preferred features of the invention are set out in the dependent claims attached hereto and will be described below with reference to exemplary embodiments of the invention.

BRIEF DESCRIPTION OF THE DRAWINGS

The invention will now be described, by way of example only, with reference to the following drawings in which:

FIGS. 9 and 10 show sectional views through the disc blank at different stages in the manufacturing process;

DETAILED DESCRIPTION OF SPECIFIC EMBODIMENTS

Figure 1:
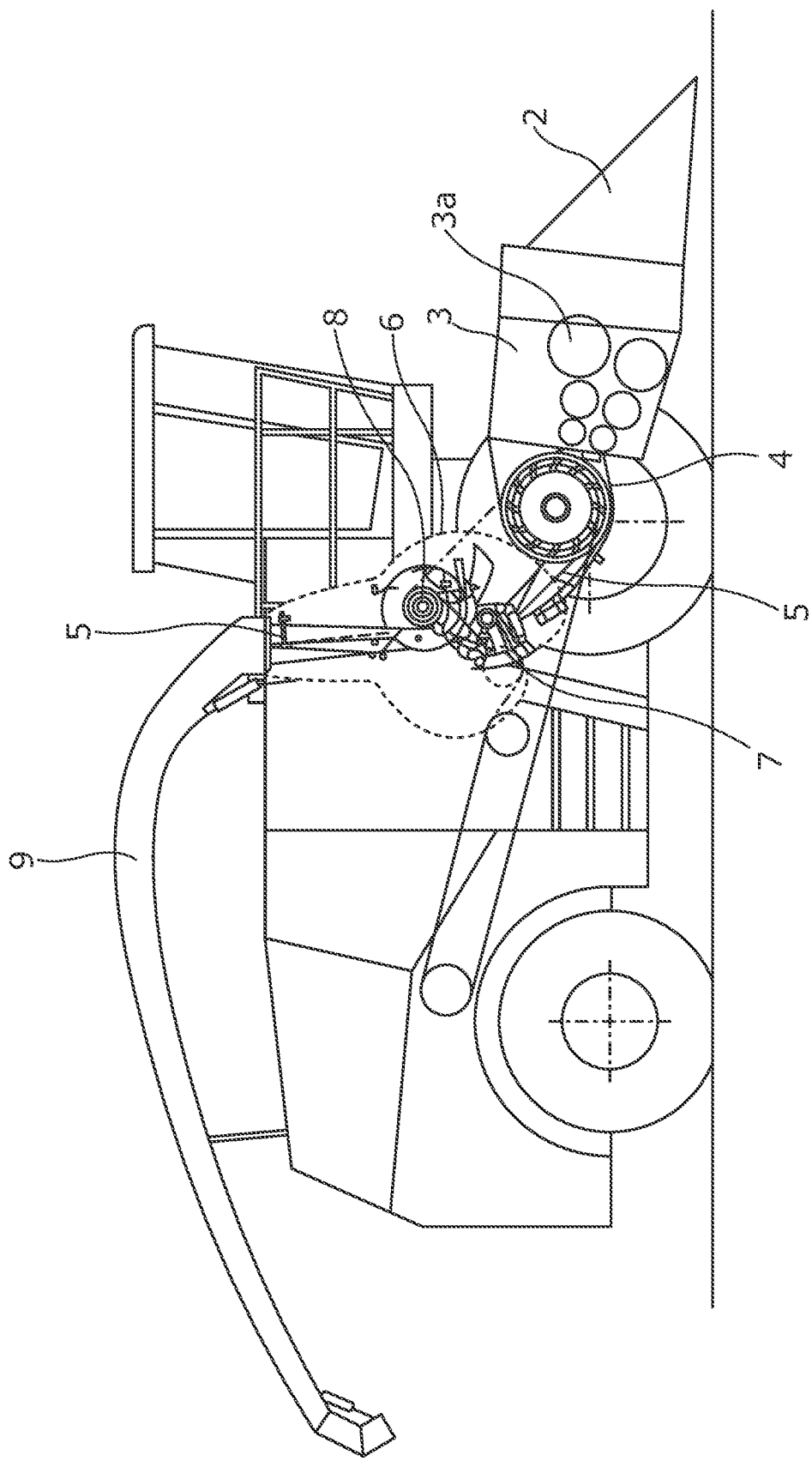
FIG. 1 is a schematic view showing functional components of a forage harvester.

FIG. 1 shows a forage harvester 1 provided with a front attachment 2 which contains cutting equipment for cutting a crop. The cut crop is fed through a series of compression rolls 3a in a compression roller housing 3 to a chopper drum 4 where the crop is chopped into smaller pieces. The chopped crop passes through duct 5 and is fed through the cracker unit 6 where the crop is further crushed and threshed. The harvested crop is then blown upwards along duct 5 by accelerator 8 and exits through spout 9. In FIG. 1 the cracker unit 6 is shown in an operational position: in a non-operational position, the cracker unit 6 is pivoted to the side of the duct 5 and therefore harvested crop by-passes the cracker roller assembly 7 as it moves through duct 5.

Figure 3:
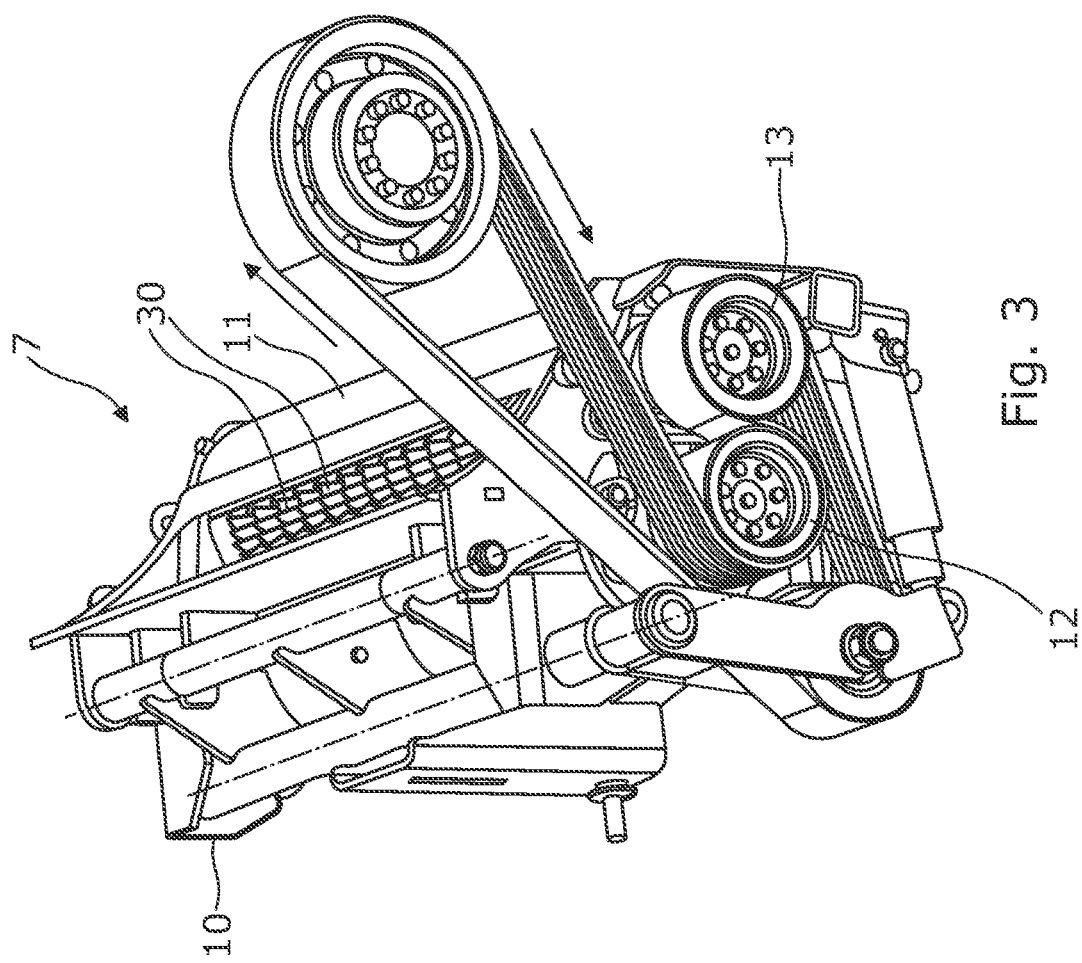
FIGS. 2 and 3 show respectively end view and perspective view of the cracker unit of FIG. 1.
Figure 2:
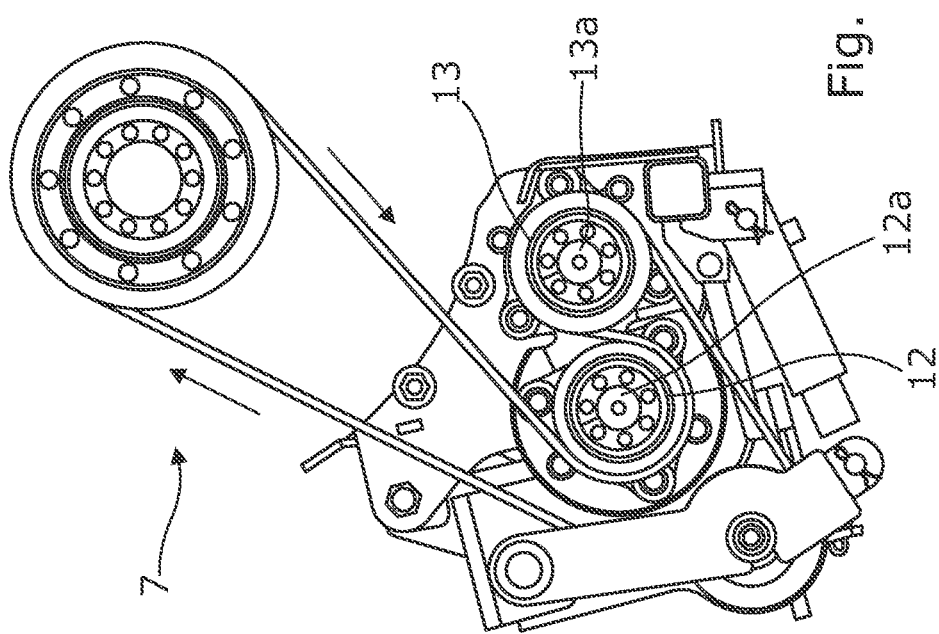

FIGS. 2 and 3 show a cracker roller assembly 7. The cracker roller assembly 7 comprises two frame parts 10 and 11 (not shown in FIG. 2). Two cracker rollers 12 and 13, each formed from seventeen discs 30 mounted on respective roller shafts 12a, 13a, are mounted to a respective frame part 10, 11. The cracker roller discs 30 are provided with teeth for cracking/crushing the harvested crop which can be seen more clearly in FIGS. 6 and 11. The cracker rollers 12, 13 are mounted parallel to each other and are rotatable about their longitudinal axes. A longitudinal space between the rollers, the roller gap, allows the cut crop to pass between the rollers.

As will be understood, the dimensions of each of the discs 30, and the number of discs per roller, may be varied. One factor affecting potential variation is the characteristics of the material to be harvested.

Figure 4:
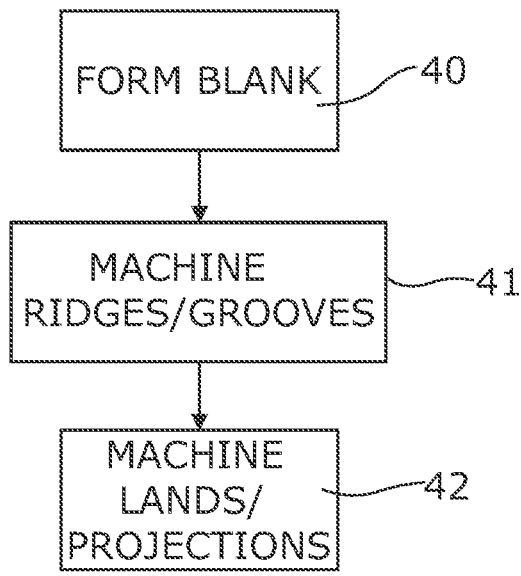
FIG. 4 is a flow chart representation of a method according to the invention.

The method of manufacture of the cracker roller discs 30 may be considered as a three-stage process, as represented by FIG. 4. The first stage 40 comprises forming a disc blank, the second stage 41 comprises machining of ridges on the surfaces of that blank, and the third stage 42 comprises machining of peripheral features to create further cutting edges. Each of these steps is described in more detail below.

Figure 5:
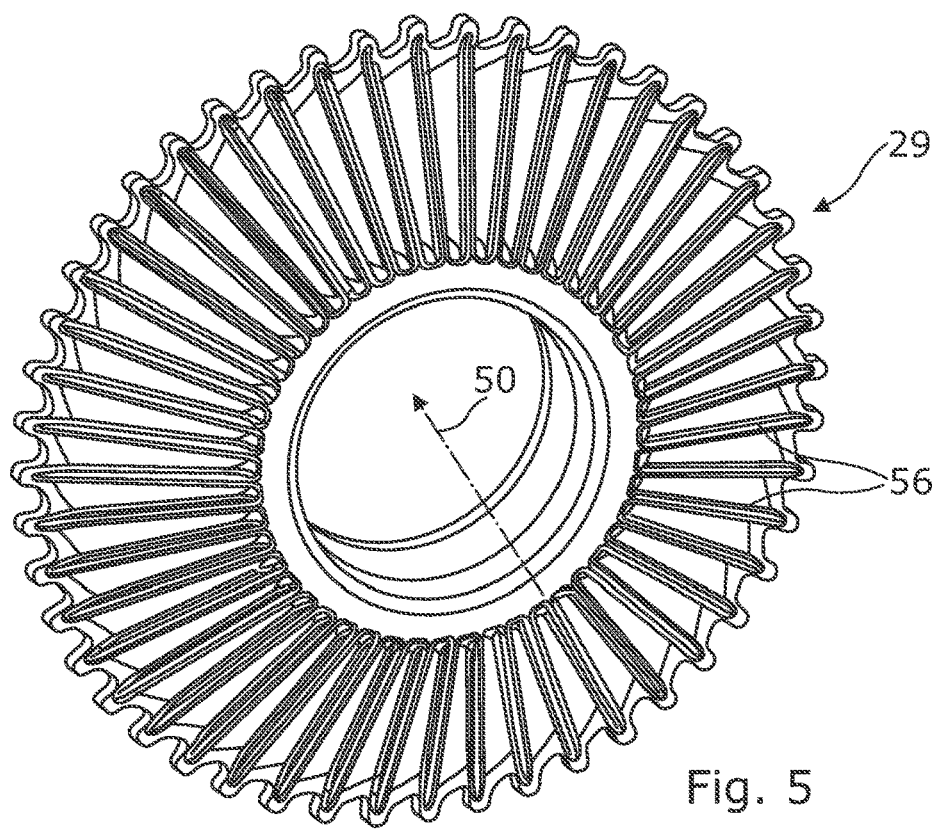
FIG. 5 is a perspective view of a forged disc blank.
Figure 6:
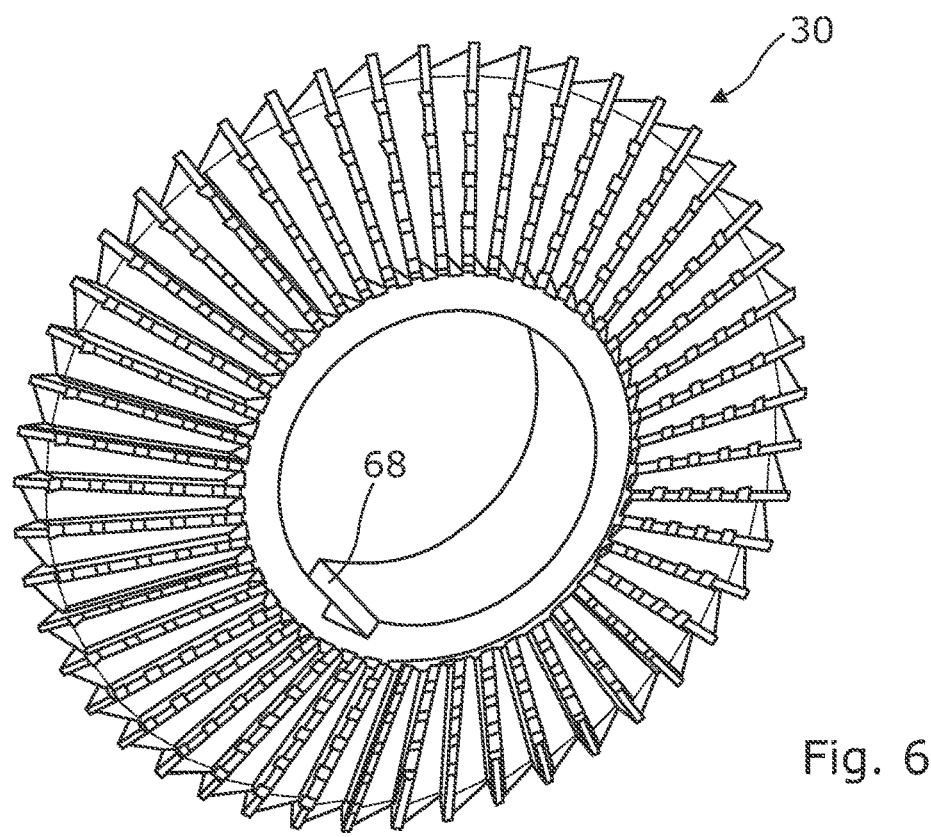
FIG. 6 is a perspective view of a machined disc.
Figure 8:
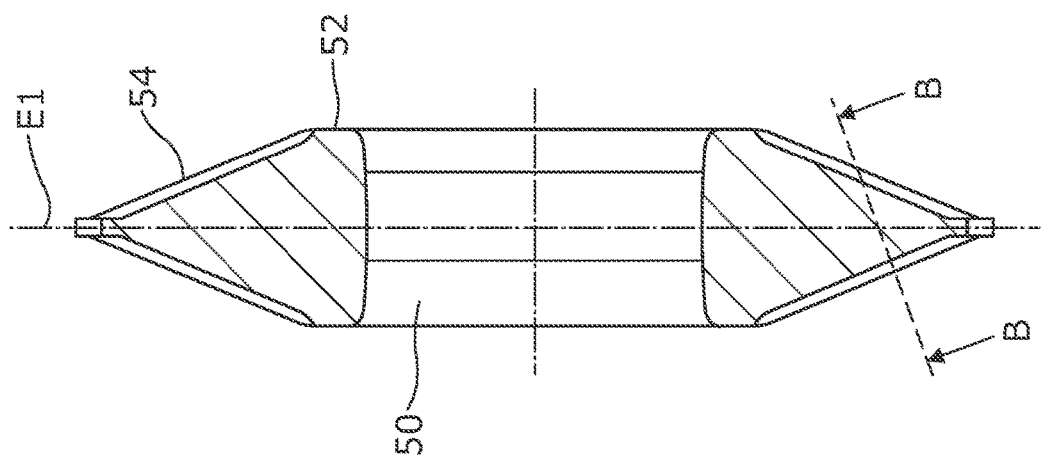
FIGS. 7 and 8 show respectively plan and sectional views of a forged disc blank.
Figure 7:
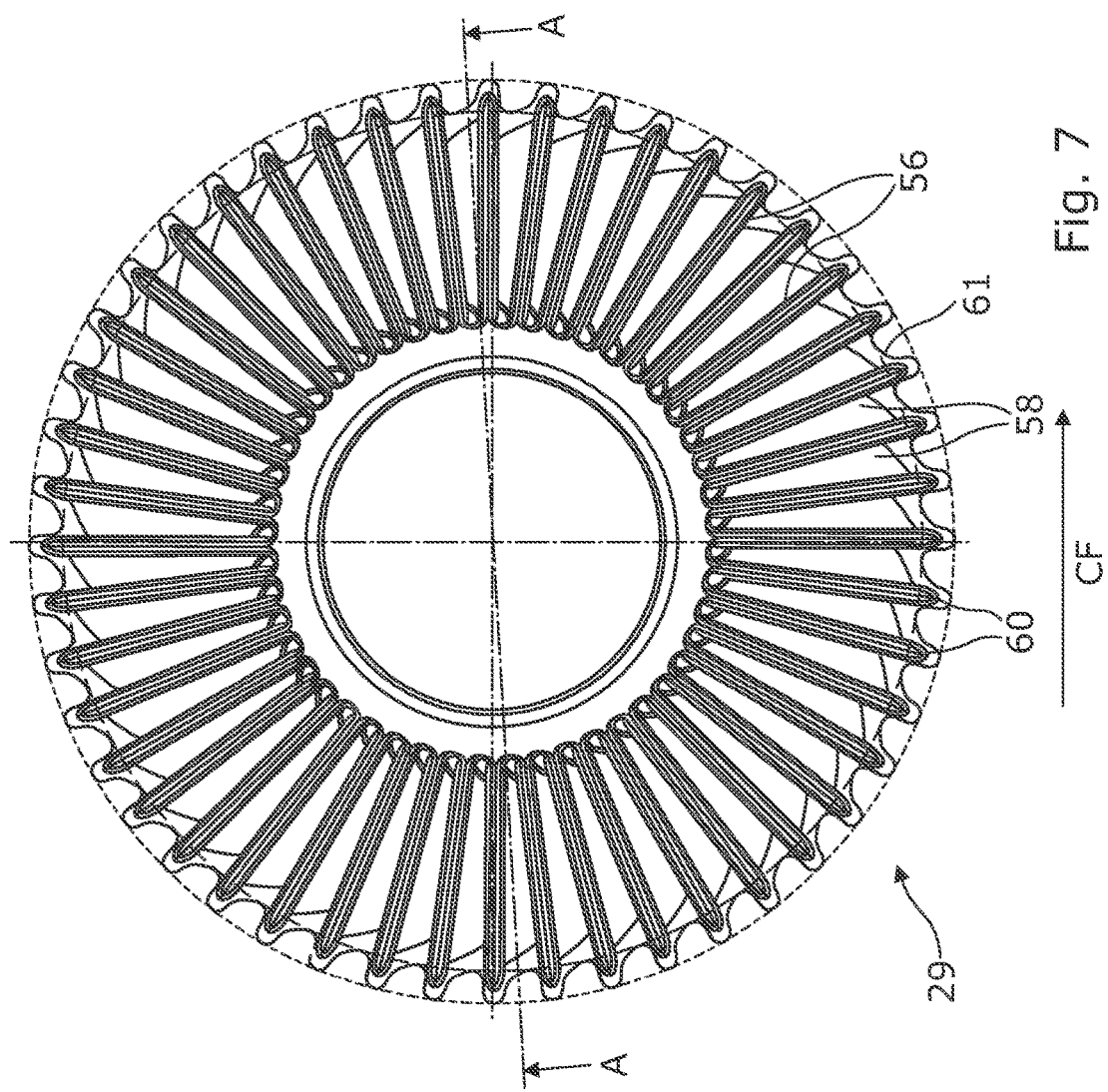

FIGS. 5 and 6 respectively show perspective views of the disc blank 29 and machined disc 30. FIG. 7 shows the disc blank 29 in plan view, and FIG. 8 is a sectional view through the disc blank taken on line AA of FIG. 7. The blank has an axial bore 50 through the centre, a first portion 52 radially outward of the centre of substantially constant thickness, and a second portion 54 radially outward of the first portion which second portion tapers towards the periphery of the disc blank providing each of the second portions with a frusto-conical profile. A suitable taper angle is 21.8 degrees, although variation is possible as mentioned above.

The disc blank 29 is a steel body which may be machined from a plain block of material but is preferably formed by forging. C45 steel is a suitable material, although other forgeable steels may be used instead. As part of the blank forming step, the forging process creates a plurality of upstanding ridges 56 extending radially outward across the second portion 54 on each face of the disc.

FIGS. 9 and 10 are sectional views through the disc blank and the machined disc taken on line BB in FIG. 8. From FIG. 9 it can be seen that the radial ridges 56 have a generally rounded profile in their upper (furthest from the disc body) portion. The lands 58, defined as the portions of disc surface between the ridges 56, are sloped from one ridge to the next to give a generally sawtooth profile. The disc blank 29 shown has 48 ridges of substantially constant width. It will be recognised that greater or fewer ridges may be provided, with the ridge height and separation being determined by the need to accommodate grain and other material of the particular crop being handled.

As can be seen from FIG. 9, the step of forming (first stage 40) includes circumferentially aligning each ridge 56 on a first face of the disc blank 29 with a corresponding ridge on the opposing face of the disc blank. Furthermore, the step of forming includes aligning the distal ends of each corresponding pair of ridges 56 with radial projections 60 spaced around the periphery of the disc blank 29, as can be seen particularly in FIG. 7. Adjacent radial projections 60 are connected via a contour 61 which is inclined radially inwards in the direction of crop flow (indicated by arrow CF) to give a generally sawtooth profile in the direction of crop flow.

Reverting to FIG. 4, the second stage 41 of the process comprises machining each of the opposed faces of the disc blank to remove the top part of each ridge 56 and leave at least one sharp edge 62 providing a cutting edge extending along each ridge Additionally, this stage removes parts of the radial projections 60. The surface of the second portion 52 and the inner surface of the bore 50 may also be machined in this operation. The section view of FIG. 10 shows one (upper) face of the disc having been machined to produce machined surfaces 64 and the edges 62. Preferably the second stage 41 is done by turning on a lathe, but may also be provided by milling in a radial direction.

Figure 13:
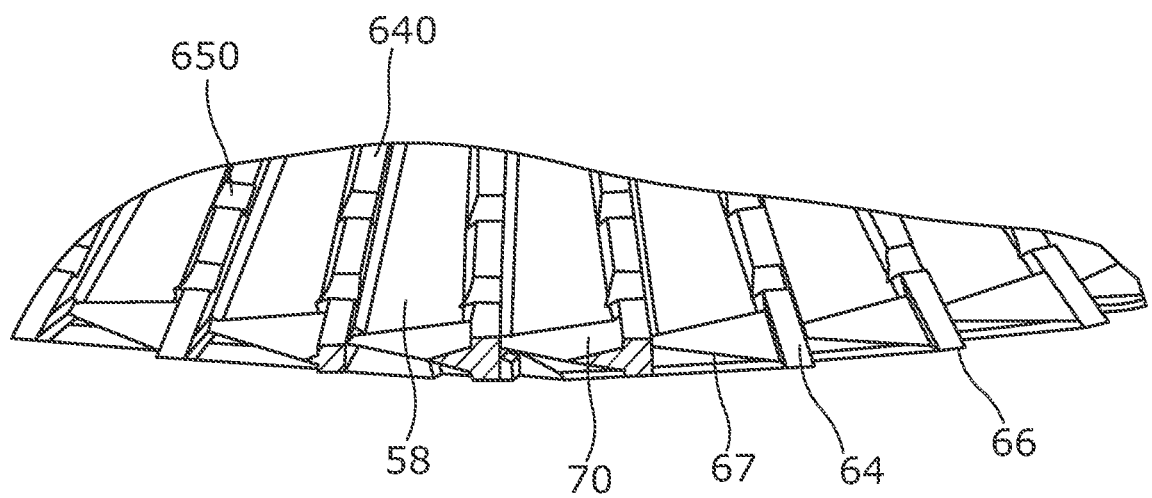
FIG. 13 is a sectional view through a part of the disc of FIG. 11.
Figure 11:
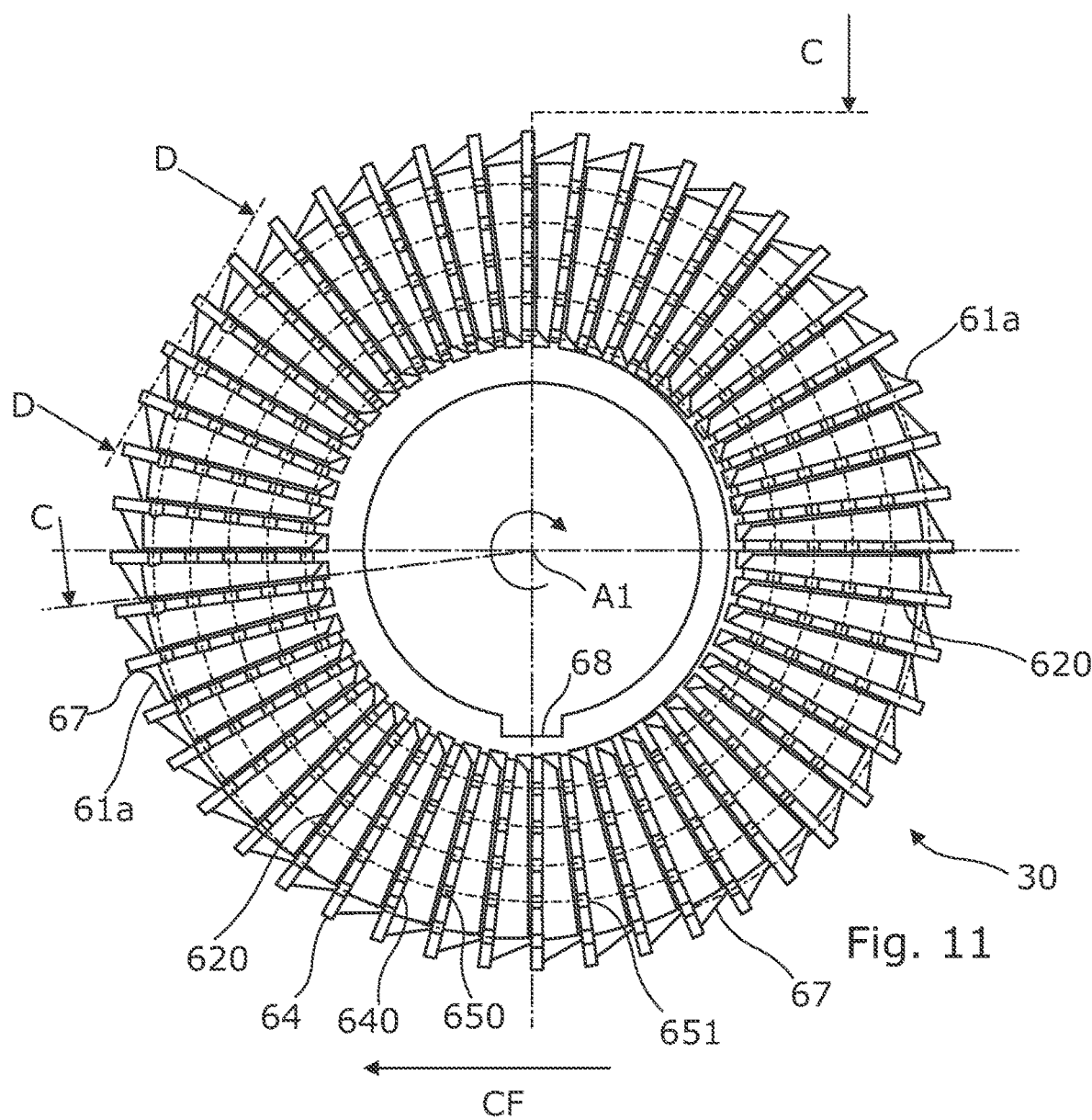
FIGS. 11, and 12 show respectively plan and half-sectional views of a finished cracker roller disc.
Figure 12:
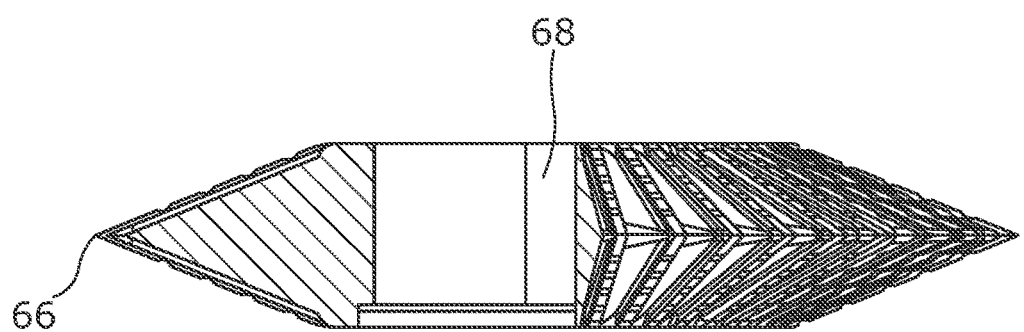

FIG. 11 is a plan view of the machined disc 30, FIG. 12 is a half section through the disc of FIG. 11 taken on line CC, and FIG. 13 is a part section through the disc of FIG. 11 taken on line DD. As best seen in FIGS. 10 and 11, the machined surfaces 64 include a conical (frusto-conical) machined surface 640 which extends radially along the ridges 56 and forms the outer contour of second portion 54. The conical machined surface 640 is further provided with a groove 650 which extends from the conical machined surface 640 towards the symmetry plane E1. Groove 650 radially extends along a spiral path (indicated with dotted line 651) and is substantially perpendicular to the ridges 56.

Figure 14:
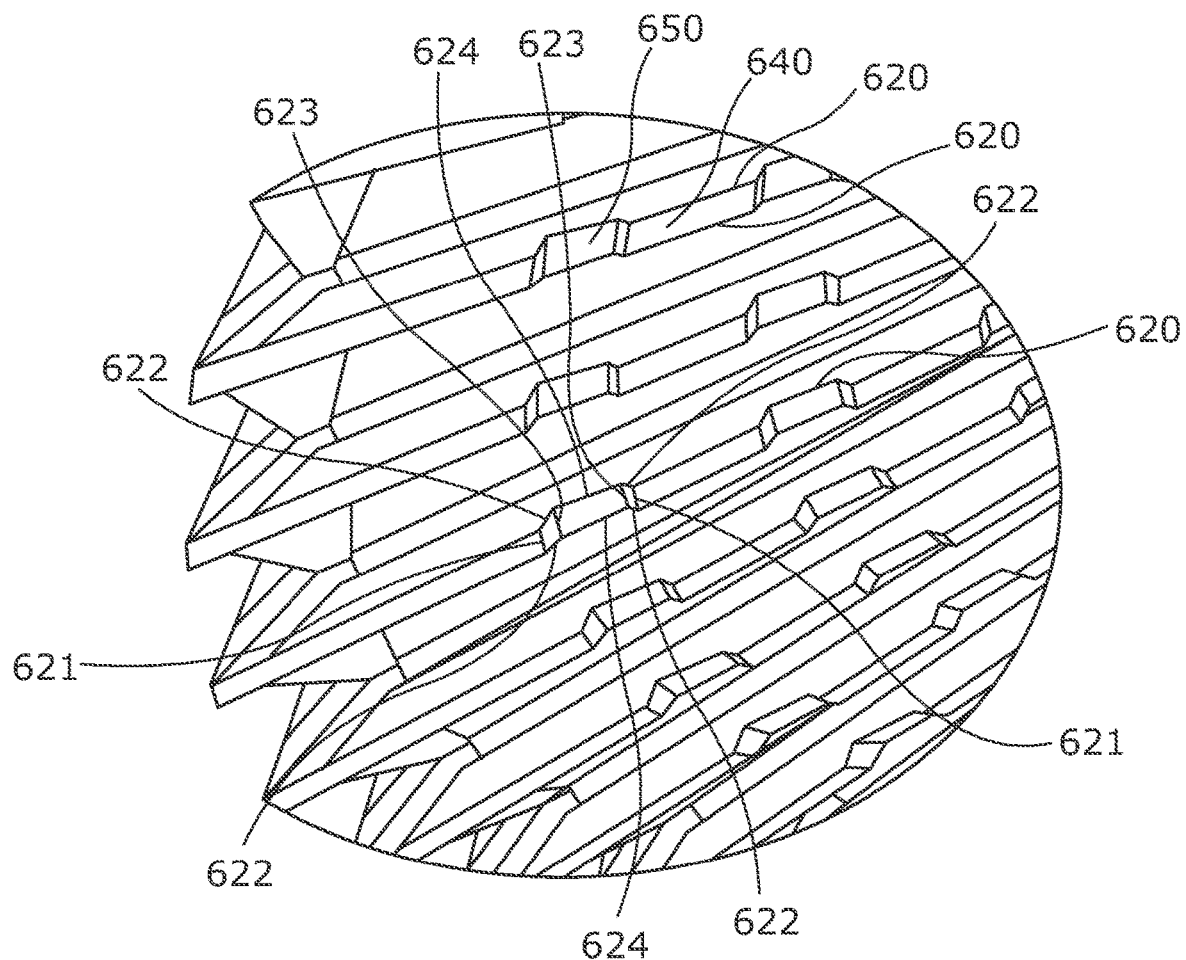
FIG. 14 is a perspective view of a machined disc.

In this way, the conical machined surface 640 provides edges 620 which are interrupted by groove 650 to form further edges described with the perspective view in FIG. 14.

First groove edges 621 are formed by the intersection of the conical machined surface 640 and groove 650 and extend substantially perpendicular to edges 620. Second groove edges 622 extend at an angle to the edges 620 towards the towards the symmetry plane E1. At the grove base third groove edges 623 which are formed substantially perpendicular to edges 620 and fourth groove edges 624 which are substantially parallel and offset to edges 620. It will be noted that the groove edges 621, 623 increase the number of edges by adding edges perpendicular to edges 620 while groove edges 622 and 624 extend the length off the overall edges provides.

Figures 15A, 15B:
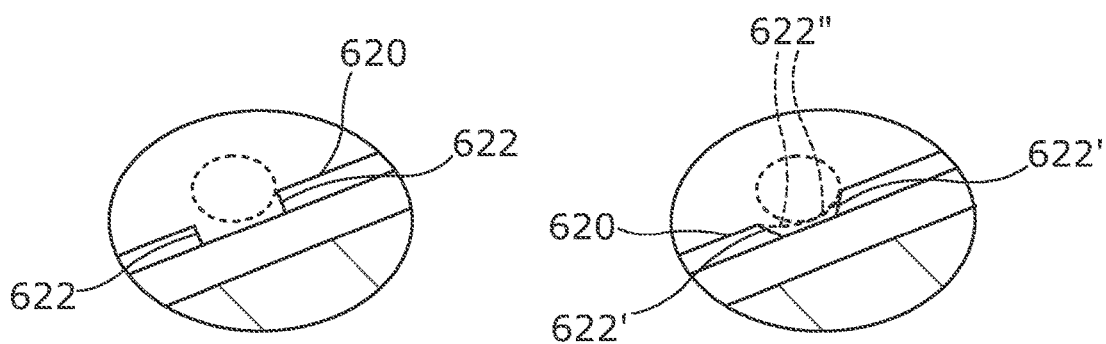
FIG. 15a, 15b are details of views of FIG. 12.

In the shown embodiment and further indicated with FIG. 15a, second groove edges 622 extend substantially perpendicular to edges 620 to form a rectangular cross section. Alternatively and as best seen in FIG. 15b, second groove edges 622' may be provided in an angle to edges 620 to form a trapezoid cross section. More alternatively, the grove may be provided with a triangular cross section as indicated by dotted line 622". It will be recognised that the geometry of the grooves 650, 652a, 652b, 652c, 652d (depth, width, height and inclination of edges relative to each other) may vary depending on the need to accommodate grain and other material of the particular crop being handled, e.g. to avoid that crop kernels are trapped in the groove and not released from cracker roller assembly 7 so that crop flow would become blocked.

Figure 16:
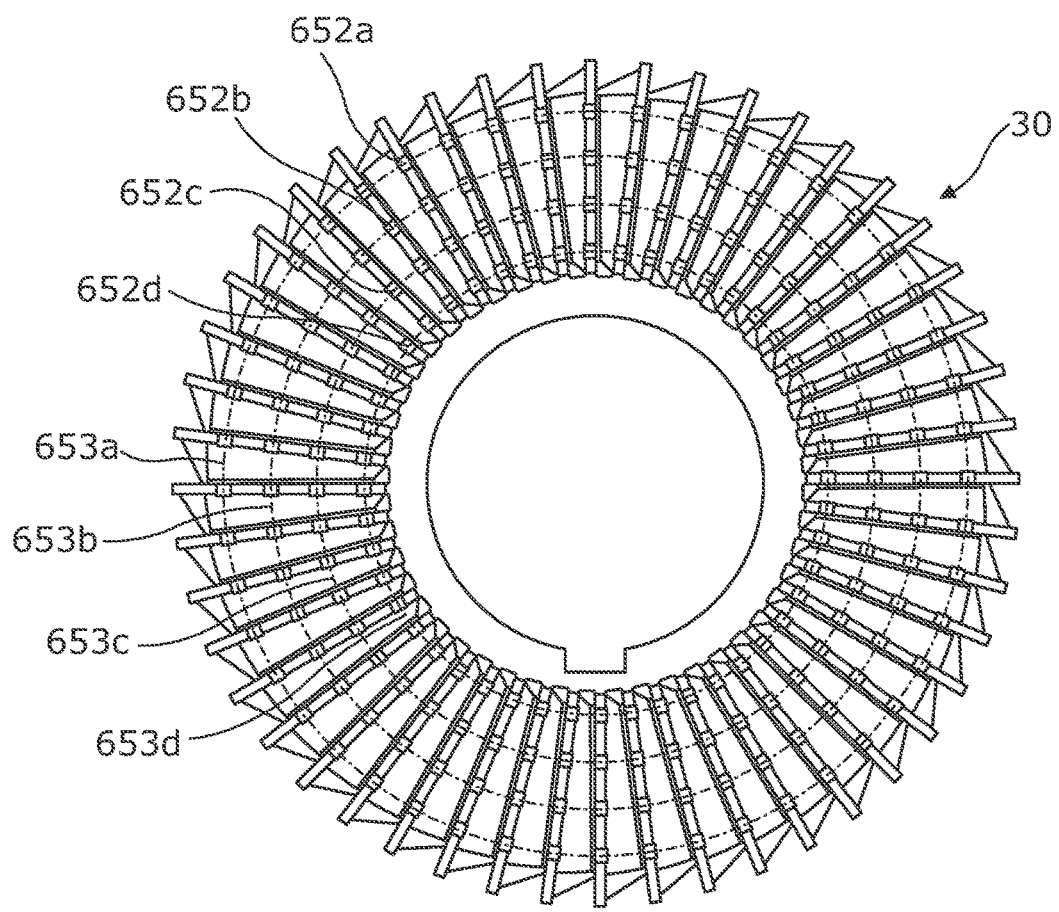
FIG. 16 is a plan view of a further embodiment of finished cracker roller disc.

In the shown embodiment of FIG. 11, the spiral groove 650 is provided which extends radially outwards in the direction of the crop flow indicted with arrow CF (REM: Please reverse the arrow in FIG. 11) in FIG. 11 to enable that crop trapped in groove 650 is pushed outwards. Alternatively and shown in FIG. 16, concentric grooves 652a, 652b, 652c, 652d may be provided, the path indicated with dotted line 653a to 653d concentric to the axis of rotation of disc 30 indicated with Axis A1.

Figure 17:
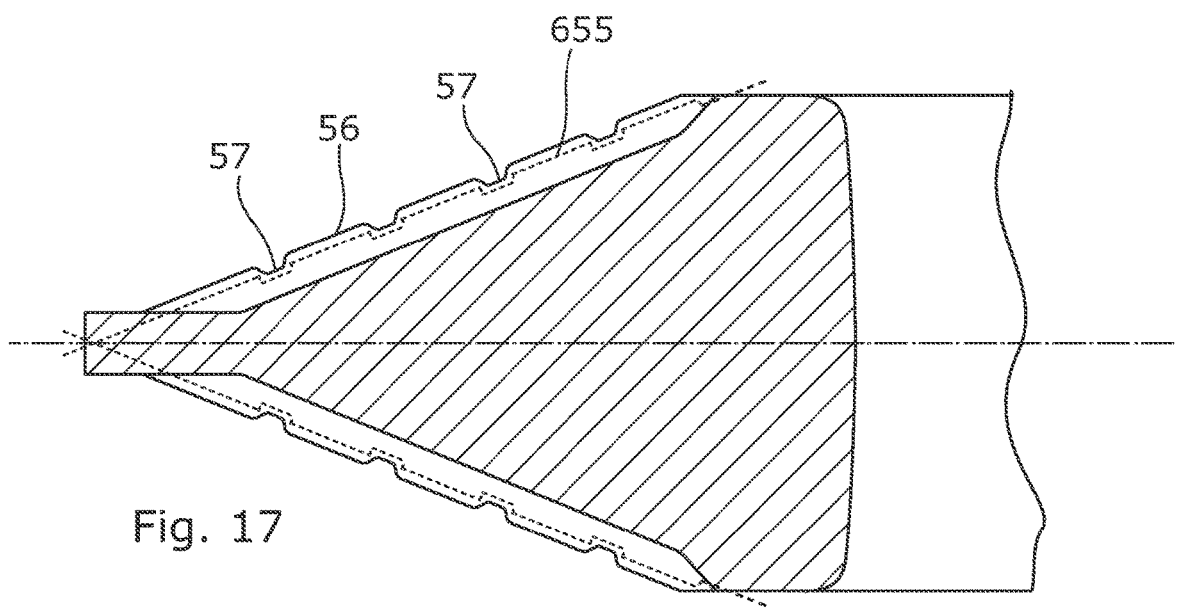
FIG. 17 is a half-sectional views of a forged roller disc.

In the shown embodiment of FIGS. 7 and 8, the forged ridges 56 are radially extending at a constant height relative to the lands 58. Alternatively, as shown in FIG. 17, the ridges 56 may be provided with indentations 57 which match with the path of the grooves 650, 652a, 652b, 652c, 652d to be machined subsequently (indicated with dotted line 655) to reduce the material to be machined.

Comparing particularly FIGS. 7, 11 and 13, it can be seen that the third stage 42 step of machining includes removing a portion of each radial projection 60 from either side of the disc blank and creating a machined area 70 of the lands 58. The machined area 70 is provided by a milling step whereby the milling cut is made at an angle inclined to the symmetry plane E1 shown in FIG. 8 so that the machined surfaces 70 of the opposing faces theoretically meet in a sharp radial inclined edge 67. Due to tolerances, this radial inclined edge 67 may be interrupted, so that contour 61 is partly present as shown in FIG. 11 with line 61a. This is not deleterious to the functioning of the disc.

In the illustrated embodiment, the design of ridges 56 is such that the machined surfaces 70 are of constant width so that, in order to create them, a milling tool with one diameter need only be moved once in between the ridges 56.

As can be seen in FIGS. 11 to 13, the machined surfaces 64, respectively the conical machined surface 640, of each ridge meet in a sharp radial edge 66. All edges 66, 67, 620, 621, 622, 623, 624 assist in the cutting of crop kernels together with leaves and stalk parts that have not been cleanly cut by the chopping drum 4 (FIG. 1).

This is preferably accomplished by turning the disc blank 29 in a second stage 41 of the process on a lathe using a single cutting tool to remove the upper part of all ridges 56 and peripheral portions 60 on a first side of the disc blank in a single turning operation, before reversing the disc blank on the lathe and machining the second side. Alternatively, a milling tool could be used to be moved along the ridges 56.

The third stage 42 of the process is preferably accomplished on a milling machine. As will be recognised, it is a further particular benefit that all of the cutting edges 67 are provided by milling the machined surface 70 which extends only partly into the lands 58, so that time on the machining tool can be greatly reduced compared to prior art techniques. In the embodiment shown, third stage 42 requires one-eighth of the conventional machining time as the movement of the machining tool is only 10 mm instead of 80 mm when machining the complete land 58. Furthermore, machining the complete land 58 would require a more complex pattern of movement of the tool as the machined surface would be more of a triangular shape, preventing the machining with a larger tool in the radially inward parts of the land 58.

If the second stage 41 and third stage 42 of the process are accomplished by using a milling machine in one step (one clamping required for each side), there is still a time saving due to the partial machining of land 58 to create machined surface 70. Alternatively the second stage 41 may be split into two steps, a first step to machine the conical machined surface 640 and a subsequent step to machine grooves 650, 652a, 652b, 652c, 652d.

Furthermore, if using a lathe to carry out the second stage 41 it may be possible to effect the third stage 42 on the same machinery if the lathe is equipped with driven tools and positionable (milling) spindle.

As used herein in relation to the invention, the term "machining" means every kind of operation in which a cutting tool or the part itself is pivoted to cut contours from said part.

The process of milling may include known milling techniques, e.g.
End/Face milling: characterised in that the tool penetrates the part along its rotational axis whereby the end face can be completely used to cut the part. In the case of stage 41, the machined surface 64 is approximately perpendicular to the rotational axis of the milling tool.
Cylindrical or plain/peripheral milling: characterised in that the tool penetrates the part perpendicular to its rotational axis whereby the circumferential face can be completely used to cut the part. In the case of stage 41, the machined surface 64 is approximately parallel to the rotational axis of the milling tool.

Furthermore, grinding (end grinding or plain grinding) could also be used according to the procedures described for milling above, although this is not a preferred option due to the typically much higher costs involved.

Referring to the first stage 40, the above embodiment describes the disc blank as a forged part. However, it will be understood that any procedure to provide a disk blank, e.g. steel casting and hardening afterwards, may be used instead. In such a case, the second stage 41 and/or third stage 42 may require the usage of grinding. Even with such a method, the partial machining of lands 58 still results in a time saving.

In the shown embodiment, the cracker disc is made of a disc blank 29 which already contains pre-shaped ridges 56 and lands 58. Alternatively, current further technique may be used which comprises lathe turning of a blank of material to generate a disc shape and then milling the surface of the blank to cut in lands 58 to form ridges 56 with a conical machined surface 640 which extends radially along the ridges 56 and forms the outer contour of second portion 54. The conical machined surface 640 may then further provided with a groove 650 which extends from the conical machined surface 640 towards the symmetry plane E1.

Referring back to FIG. 3, the present invention also provides a cracker roller 12, 13 made up of discs 30 manufactured as described above and mounted on a roller shaft 12a, 13a. To assist this, an axially extending keyway 68 is cut in the wall of the bore 50 through the disc blank: when mounted on a roller shaft 12a, 13a, a radially extending key or projection (not shown) from the shaft engages the keyway 68 to prevent the discs 30 rotating relative to the shaft.

From reading of the present disclosure, other modifications will be apparent to those skilled in the art and the scope of the invention is limited only by the following claims.

The invention claimed is:

1. A cracker roller disc, having an axial bore through a centre, a first portion extending radially outward of the centre and of substantially constant thickness, a second portion extending radially outward of the first portion and tapering towards a periphery of the disc, and further comprising a plurality of conical machined surfaces forming radially extending edges on opposed faces of the disc;
wherein the edges are interrupted by grooves extending substantially perpendicular to the edges, and wherein the grooves on the opposed faces of the disc extend on a spiral path.

2. A cracker roller disc having an axial bore through a centre, a first portion extending radially outward of the centre and of substantially constant thickness, a second portion extending radially outward of the first portion and tapering towards a periphery of the disc, and further comprising a plurality of conical machined surfaces forming radially extending edges on opposed faces of the disc;
wherein the edges are interrupted by grooves extending substantially perpendicular to the edges and wherein the grooves are configured with a rectangular or a trapezoidal or a triangular shaped section.

3. A cracker roller comprising a plurality of discs as claimed in claim 1, axially aligned and mounted on a common shaft.

4. A cracker roller comprising a plurality of discs as claimed in claim 2, axially aligned and mounted on a common shaft.

* * * * *